United States Patent
Hummel et al.

(10) Patent No.: US 7,229,375 B2
(45) Date of Patent: Jun. 12, 2007

(54) BACK DRIVE SILENT CHAIN SYSTEM WITH LOW PROFILE SPROCKET

(75) Inventors: John A. Hummel, Ithaca, NY (US); Harold J. Fraboni, Freeville, NY (US)

(73) Assignee: BorgWarner Inc., Auburn Hills, MI (US)

( * ) Notice: Subject to any disclaimer, the term of this patent is extended or adjusted under 35 U.S.C. 154(b) by 616 days.

(21) Appl. No.: 09/840,434

(22) Filed: Apr. 23, 2001

(65) Prior Publication Data

US 2002/0155911 A1  Oct. 24, 2002

(51) Int. Cl.
 *F16G 13/02* (2006.01)
(52) U.S. Cl. ....................................... 474/213
(58) Field of Classification Search ................ 474/212, 474/213, 214, 151, 152, 156, 160
See application file for complete search history.

(56) References Cited

U.S. PATENT DOCUMENTS

| | | | |
|---|---|---|---|
| 270,723 A * | 1/1883 | Aydelott | ..................... 474/212 |
| 1,140,319 A | 5/1915 | Van Houten | |
| 1,956,942 A | 5/1934 | Belcher et al. | ................ 74/245 |
| 2,056,602 A | 10/1936 | Dull et al. | |
| 2,631,460 A | 3/1953 | Transeau | |
| 4,058,021 A | 11/1977 | Wood | |
| 4,509,323 A | 4/1985 | Ledvina et al. | |
| 4,741,725 A * | 5/1988 | Ingold | ......................... 474/212 |
| 5,176,585 A | 1/1993 | Novak | ......................... 474/206 |
| 5,362,278 A * | 11/1994 | Bergles et al. | ................ 474/69 |
| 5,967,926 A | 10/1999 | Kozakura et al. | ............ 474/213 |
| 5,989,140 A * | 11/1999 | Ichikawa et al. | ............ 474/148 |
| 6,039,665 A * | 3/2000 | Nakamura | .................... 474/157 |

FOREIGN PATENT DOCUMENTS

| | | |
|---|---|---|
| EP | 0926394 | 6/1999 |
| GB | 230839 | 8/1925 |
| GB | 2326213 | 12/1998 |

* cited by examiner

*Primary Examiner*—Vicky A. Johnson
(74) *Attorney, Agent, or Firm*—McAndrews, Held & Malloy, Ltd.; Greg Dziegielewski

(57) ABSTRACT

A silent chain and sprocket assembly is disclosed for use with a chain tensioner that provides driving contact on both sides of the chain and improved system wear, noise and vibration characteristics without adding to the chain's weight or material costs. The front-side sprockets employ sprocket teeth and engage the front-side silent chain links in conventional fashion. The back-side driven sprockets differ from prior silent chain sprockets in that the sprockets employ small protrusions instead of traditional teeth. The silent chain engages a back-side sprocket protrusion using the geometry of either a single link, or that of two adjacent links, as the chain wraps on the back-side sprocket.

4 Claims, 4 Drawing Sheets

BACK DRIVE SILENT CHAIN SYSTEM WITH LOW PROFILE SPROCKET

BACKGROUND OF THE INVENTION

The present invention relates generally to silent chain and sprocket power transmission systems. In particular, the present invention relates to silent chain and sprocket systems that are capable of transferring power from either side of the silent chain.

Silent chain and sprocket power transmission systems are typically used in automotive engine timing system applications. The timing system transfers power from an automotive engine's crankshaft to the engine's camshafts, which operate the engine's intake and exhaust valves. A timing system may also be used to drive other engine accessories.

A basic timing system consists of a chain, two or more sprockets, and a tensioner. As its name implies, a tensioner applies a tensioning force to the chain. This tension ensures that the chain cannot slip on the sprockets, and thus change the engine timing. The tensioner of a timing system is important because, unlike many chain and sprocket applications, a slip by the chain of a timing system will change the valve timing which could result in poor performance or even engine damage.

Automotive timing systems also differ from other chain and sprocket applications because noise created by timing systems can reach an unacceptable level. Roller chains create a loud impact noise when the roller element of the chain strikes the sprocket root area. Roller chain and sprocket drives for engine timing systems often generate unacceptable levels of noise. Silent chains attempt to duplicate the quieter sliding contact that characterizes gear-tooth engagement. Therefore, many timing systems now use a silent chain and sprocket drive to reduce the amount of noise generated as the chain engages the sprocket.

A conventional silent chain is typically formed of interleaved sets of inverted tooth links. Inverted tooth links of traditional silent chains used in timing systems form two teeth on one side of the chain that engage sprockets. A set or row of links is assembled by positioning several links alongside of or adjacent to each other. The links are connected by pivot means, which are usually round pins received in a pair of apertures of each link of the row. Adjacent rows of links are interleaved so that apertures of adjacent rows are aligned to receive a pivot means that joins adjacent rows and allows relative rotation of the rows. The direction from one joined row to the next is the chain direction. Silent chains having teeth on one side of the chain are incapable of driving sprockets on both sides of the chain. An example of a traditional silent chain used in a timing system application can be found in U.S. Pat. No. 4,509,323.

Due to the limited engine compartment space available for separate engine accessory drive systems, many automotive timing systems are also used to drive engine accessories, as well as camshafts. Because traditional silent chains are incapable of driving sprockets on both sides of the chain, long and convoluted serpentine arrangements may be required to drive engine accessories. The size and complexity of today's automotive timing systems can be minimized if sprockets could be driven on both sides of the timing chain.

Roller chain and sprocket systems are well suited for driving sprockets on both the front and the back sides of the chain, but as mentioned above, the noise characteristics of roller chain systems make them undesirable for timing system use. Furthermore, existing silent chain designs that are capable of engaging sprockets on both sides of the chain do so by providing links having teeth on both sides of the chain to achieve driving contact between the back-side of the chain and a toothed sprocket. An early example of such a back-drive chain is disclosed by U.S. Pat. No. 1,140,319. FIG. 1 shows a chain 54 in back-side driving contact with a toothed sprocket 56. Back-side teeth 58 engage the sprocket 56. However, when a conventional silent chain incorporating toothed back-side driving links similar to those in FIG. 1 is used with a back-side chain tensioner, the intermittent contact between the back-side link teeth 58 and the chain tensioner can result in wear and vibration problems.

In timing systems having a tensioner, the tops of the teeth on the back side of such a chain make intermittent contact with the shoe face of the tensioner. That intermittent contact causes wear, shortens the service life of the tensioner shoe, and also leads to vibration problems that may cause the chain to stretch as well as increase the system noise level.

U.S. Pat. No. 5,967,926 addresses the intermittent contact problem by adding flat-faced links to the back-side of a silent chain. To promote increased sliding contact between the back-side of the chain and a chain tensioner, as shown by FIG. 2, non-driving outer links 66 were added to the chain. The flat profile 68 of the back-side of these outer links 66 extends beyond the back-side link teeth 64. The flat profile 68 on the rear side of the chain facilitates sliding contact with the shoe faces of a tensioner and prevents the back-side teeth 64 from contacting a tensioner shoe face. Of course, these additional links also add to the weight and material costs of the chain. As shown by FIG. 2, a back-side driving chain link 60 may have a shallow back-side driving link tooth root 62 that limits engagement of a sprocket by back-side teeth 64.

There is a need for a silent chain and sprocket assembly for use with a chain tensioner that is capable of providing driving contact on both sides of the chain. Furthermore, there is also a need for a silent chain and sprocket assembly for use with a chain tensioner that provides improved system wear and vibration characteristics over current designs without adding to the chain's weight or material costs.

BRIEF SUMMARY OF THE INVENTION

It is an object of the present invention to address the above-mentioned problems of the prior art by a low profile geometry for the back-side of silent chain links and a sprocket having low profile protrusions that engage the low profile geometry of the chain.

According to the present invention, a silent chain and sprocket assembly is provided that is capable of driving sprockets on either side of the chain and can be used in systems having a conventional chain tensioner. The sprockets that engage the front-side of the chain have a plurality of conventional sprocket teeth disposed about their periphery. The sprocket or sprockets that engage the back-side of the chain have a plurality of small, low profile protrusions disposed about the periphery of the sprocket or sprockets.

A silent chain according to the present invention may be comprised of a series of interleaved inner and outer rows of links. The link rows are formed by adjacent inverted tooth links. The outer link rows each have a pair of outer link plates mounted to spaced pin members. The outer link plates have a front-side and a back-side. The front-side of the outer link plates forms two teeth that engage three sprocket teeth of the front-side sprocket in a conventional manner. The back-side of the outer link plates is formed so as to engage the low profile protrusions on the periphery of the back-side sprocket, either alone overlying a single protrusion, or in combination with an adjacent link row extending along adjacent surfaces of adjacent protrusions, as the chain wraps on the back-side sprocket.

Each inner link row may include a pair of bushings through which the pins mounted to the outer link plates extend. The inner link rows also have a front-side and a back-side that are adjacent to the front and back-side of the outer link plates. The front-side of the inner row links form two teeth that engage three sprocket teeth of the front-side sprocket in a conventional manner. The back-side of the inner row link is formed so as to engage the low profile protrusions on the periphery of the back-side sprocket, either alone overlying a single protrusion, or in combination with links of an adjacent link row extending along adjacent surfaces of adjacent protrusions, as the chain wraps on the back-side sprocket.

The lack of conventional high profile teeth on the back-side of the chain promotes sliding contact of the links with a chain tensioner and diminishes the abrupt impact that is characteristic of conventional chain teeth and tensioner shoe contact. This arrangement results in lower chain noise levels and improved system wear and vibration characteristics while avoiding the need for costly additional chain links to accomplish this sliding contact.

DETAILED DESCRIPTION OF THE INVENTION

Figure 1:
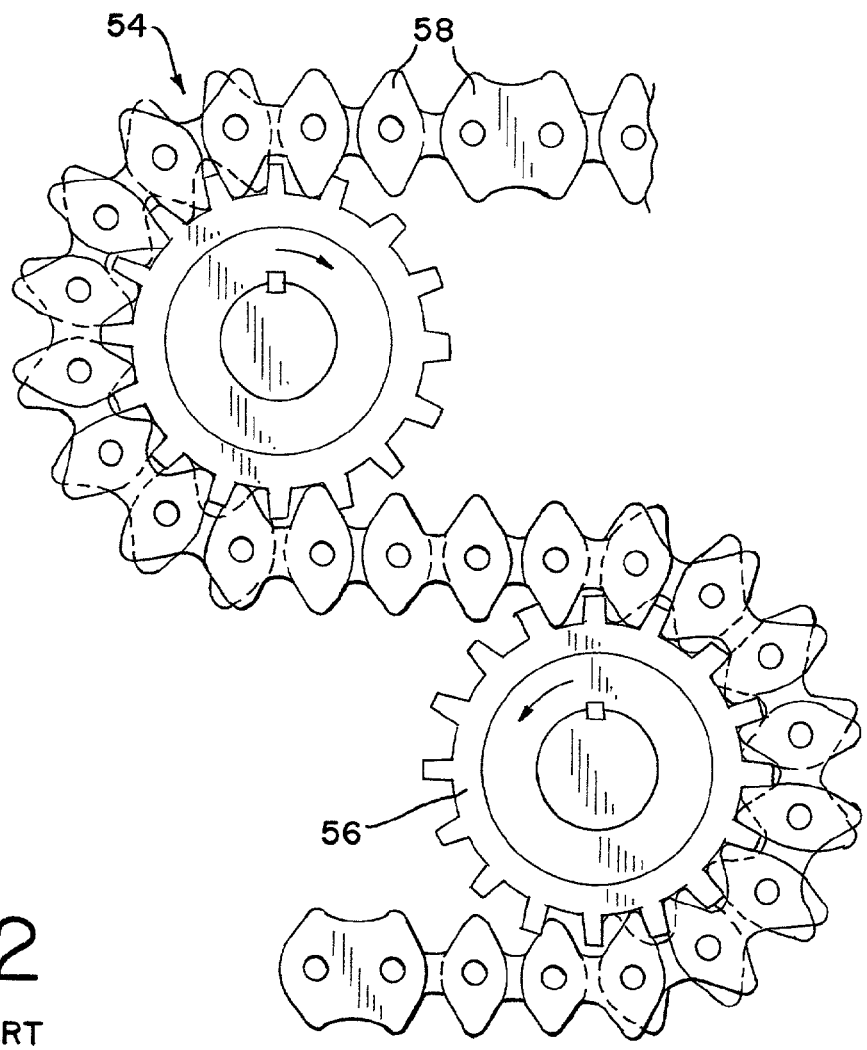
FIG. 1 is a side view of conventional toothed sprockets engaging the front and back sides of a silent chain having double-sided toothed links.
Figure 2:
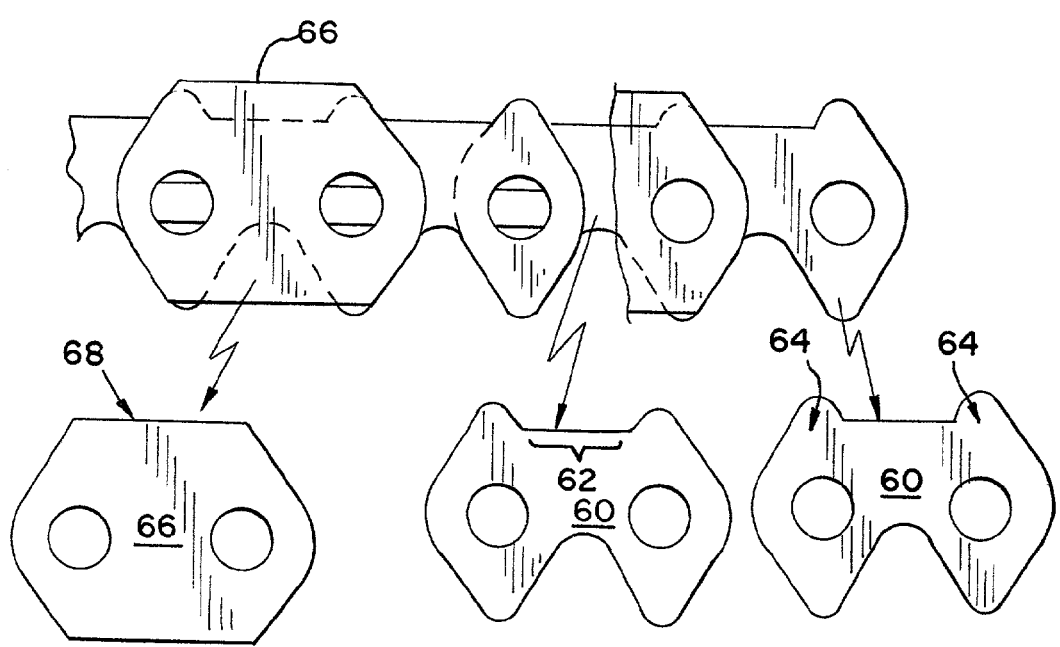
FIG. 2 is a side view of a portion of a silent chain having double-sided toothed links and additional links having surfaces that contact and slide on a tensioner.
Figures 3, 4:
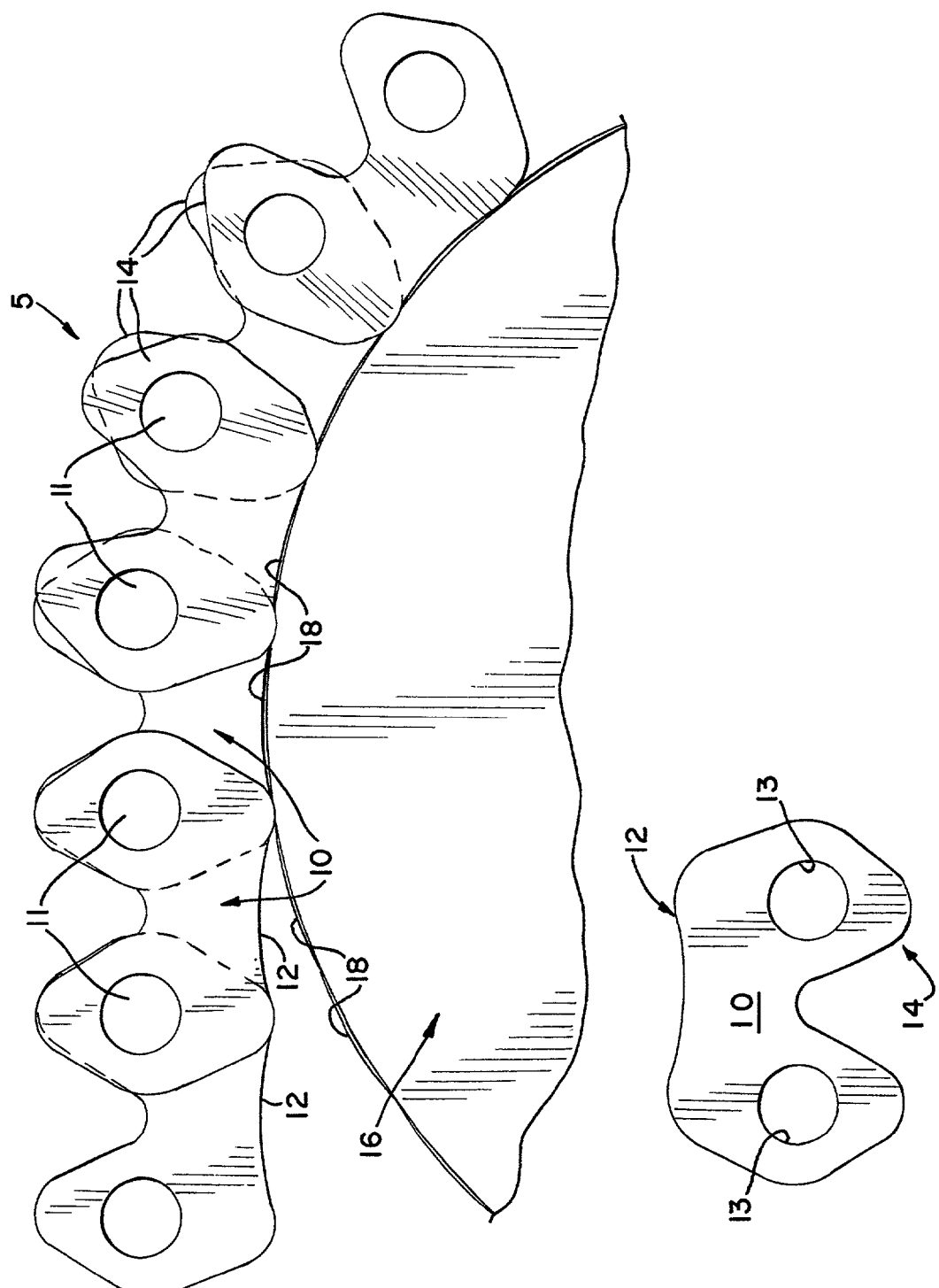
FIG. 3 is a side view of a portion of a sprocket having low profile teeth shown in driving contact with the back-side of a portion of a silent chain according to the present invention.
FIG. 4 is a side view of an individual link of the silent chain shown by FIG. 3.

A silent chain and sprocket assembly according to the present invention improves upon known silent chain and sprocket assemblies that drive from the back-side of a silent chain. According to the present invention, a chain is provided that has links with a generally smooth back-side surface. The chain engages a sprocket that has low profile protrusions that engage the back-side of the chain links as the chain wraps the periphery of the sprocket. The links of the chain conform to the sprocket protrusions either individually as depicted by FIGS. 3 and 4, or in conjunction with adjacent links, as shown in FIGS. 5, 6, 7 and 8. The generally smooth back-side profiles of these links increase the silent chain back-side to tensioner sliding contact, substantially reducing the wear and vibration problems associated with prior silent chains that engage a sprocket at the back-side of the chain without adding the additional weight and material costs of special links as shown by FIG. 2.

This improvement is realized by an embodiment of the present invention shown by FIG. 3. The chain 5 includes silent chain links 10. The links 10 are arranged adjacent to each other along a chain direction of the chain 5 and are joined by pins 11. Links 10 may be positioned adjacent to each other in a lateral direction, perpendicular to the chain direction, to form rows of links 10.

As best shown by FIG. 4, the links 10 define apertures 13 that are separated along the chain direction. The apertures 13 are located near opposite ends of the link 10 along the chain direction and are sized to accept pins 11. The links 10 have a concave back-side surface 12. The surface 12 conforms to low convex protrusions 18 along the periphery of sprocket 16. The concave surface 12 extends from a location adjacent to one aperture 13 substantially the length of the link 10 along the chain direction to a location adjacent to the other aperture 13. As the silent chain 5 wraps around the sprocket 16, each protrusion 18 contacts a link 10, or links 10 of a single row. As best shown by FIG. 3, the back-side link surface 12 of each link 10 overlies and engages a sprocket protrusion 18 to create a driving contact. The protrusions 18 do not engage links 10 that are adjacent along the chain direction to the link 10 that overlies the protrusion 18.

The low profile back-side link surface 12 also improves sliding contact between the link 10 and a tensioner shoe, as compared to the intermittent contact of conventional toothed designs, such as the front-side of the links 10. Front-side link teeth 14 formed by the links 10 are of a conventional silent chain tooth design. The teeth 14 of each link 10 engage three teeth of a conventionally toothed front-side sprocket, one tooth at each end of the link 10 along the chain direction, and one tooth along the link 10 between the teeth 14. By contrast, the back-side link surface 12 is formed to engage only one protrusion 18 that extends substantially the length of the link 10 along the chain direction. The low profile of the protrusions 18 and their length to engage one link 10 along substantially its chain direction length permits the surface 12 to have a profile that is smoother than the profile of the front-side of the link 10 along the teeth 14.

Figure 5:
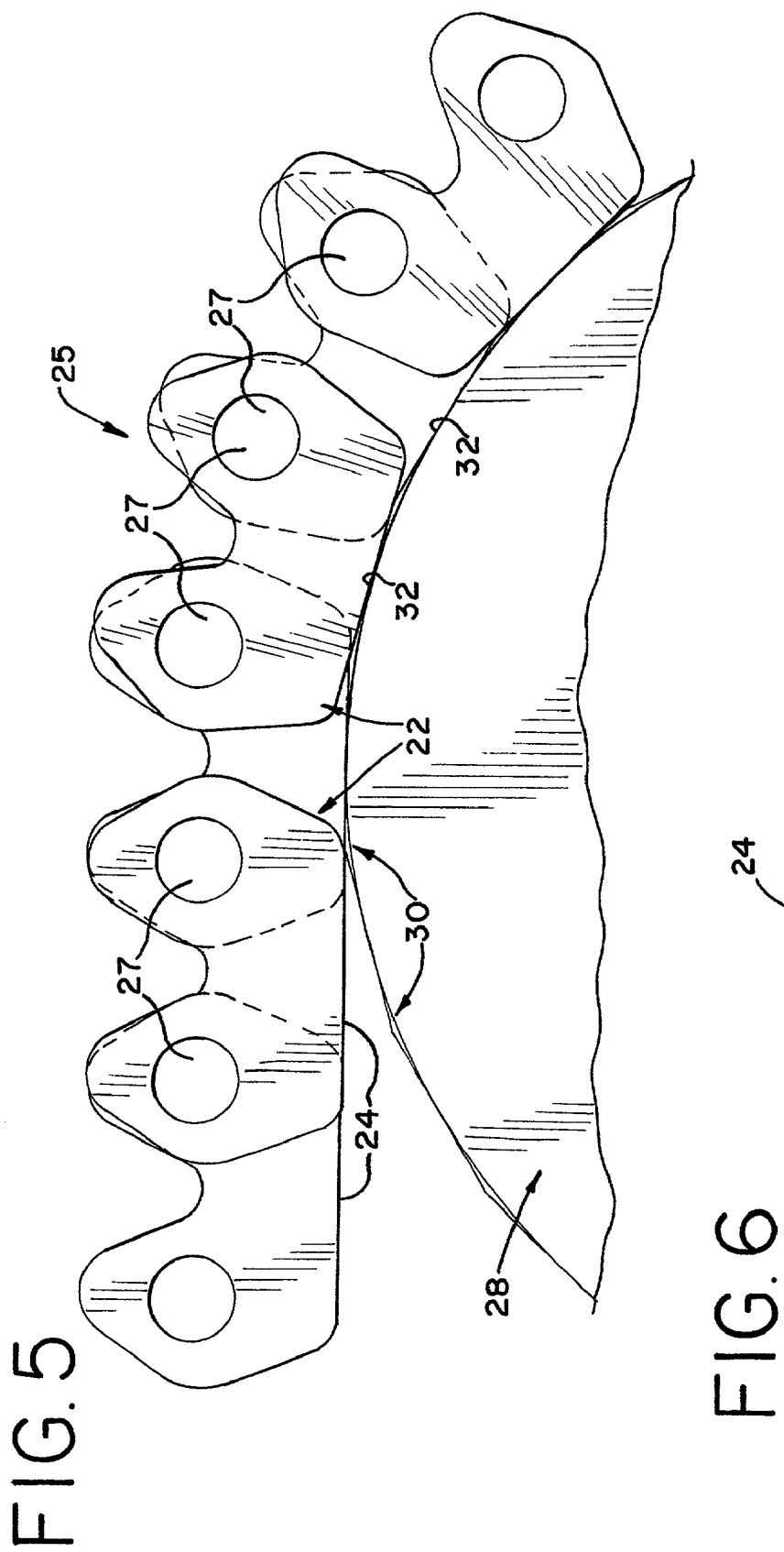
FIG. 5 is a side view of a portion of a sprocket having low profile teeth engaging a silent chain having links with a flat back-side according to the present invention.
Figure 6:
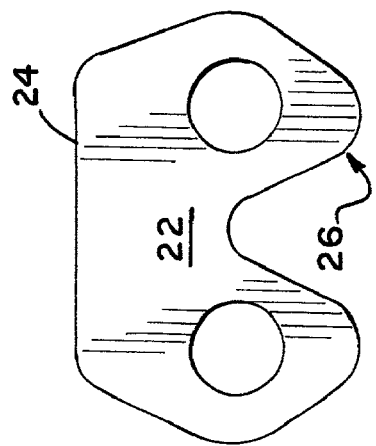
FIG. 6 is a side view of an individual link of the silent chain shown by FIG. 5.

A second embodiment of the present invention, as depicted in FIG. 5, includes a silent chain 25 having links 22 that are joined by pins 27. As shown in FIG. 6, the links 22 have a back-side link surface 24 that is flat. The silent chain 25 engages a sprocket 28 that has protrusions 30 along its periphery that are formed by flat surfaces 32. Each surface 32 extends generally along the periphery of the sprocket 28 to meet an adjacent surface 32 and to form, with the adjacent surfaces 32, a protrusion 30 at each end of the surface 32 along the periphery of the sprocket 28. The link back-side surface 24 does not overlie a sprocket protrusion 30, but rather overlies a flat surface 32. As the links 22 of the silent chain 25 wrap around the sprocket 28, adjacent links 22 articulate with respect to each other about a pin 27. Two adjacent links 22 articulate to wrap a low flat sided protrusion 30 of the sprocket 28 to position a back-side surface 24 of adjacent links 22 against the surfaces 32 that form a protrusion 30.

The back-side link surfaces 24 of the adjacent links 22 come into driving contact with the surfaces 32 that form a sprocket protrusion 30. The link surface 24 is substantially the length of the link 22 along the chain direction of the link 22. The length of the protrusions 30 along the periphery of the sprocket 28 is substantially the distance between pins 27 that engage a link 22, and are consequently substantially the length of the link 22 along the chain direction.

The flat back-side link surface 24 again will slide along a tensioner, which is an improvement over the intermittent contact of conventional toothed designs. The front-side 26 of the link 22 is again a conventional silent chain tooth design wherein each link 22 quietly meshes with a front-side sprocket by engaging three teeth of the sprocket.

Figure 7:
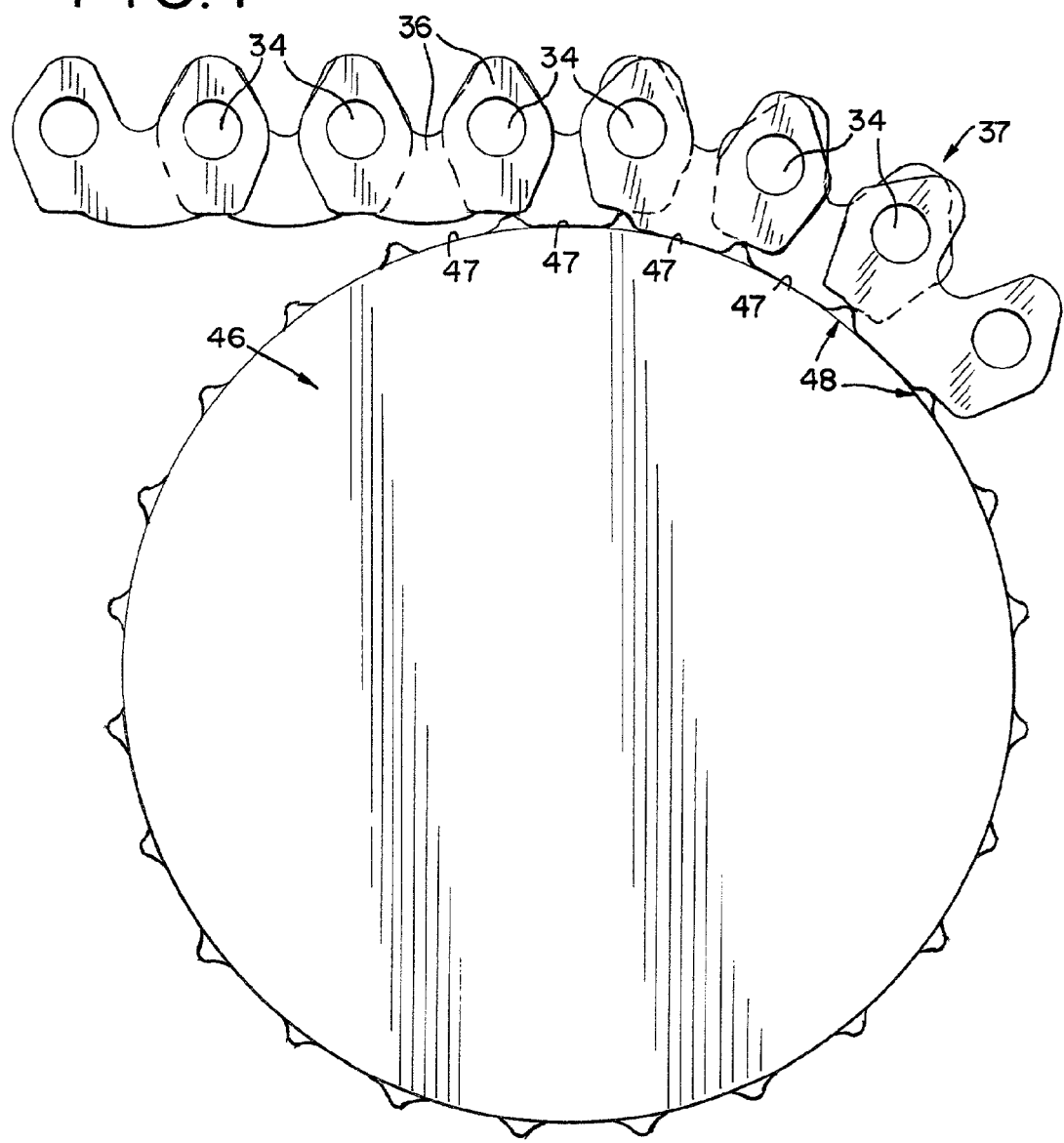
FIG. 7 is a side view of a portion of a sprocket having low profile teeth shown in driving contact with a portion of a silent chain according to the present invention that is comprised of links having a back-side surface that conforms to the periphery of the sprocket along adjacent surfaces of adjacent low profile protrusions.
Figure 8:
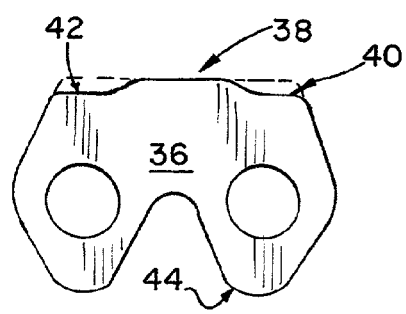
FIG. 8 is a side view of an individual link of the silent chain shown in FIG. 7.

In a third embodiment of the present invention, shown in FIGS. 7 and 8, links 36 of a chain 37 have a small amount of material removed from the leading edge 40 and trailing edge 42 as compared to a flat back side link surface 24 of a link 22 as shown by FIG. 6. In a similar manner as described for the embodiment shown by FIGS. 5 and 6, two adjacent links 36 articulate with respect to each other at a pin 34 that joins the two links. The adjacent links 36 wrap around a protrusion 48 of a sprocket 46. The surfaces 38 of adjacent links 36 form a geometry that conforms to surfaces 47 that form adjacent surfaces of adjacent low protrusions 48 on the sprocket 46. The surfaces 47 are generally flat between the ends of the surface, and extend outwardly from the sprocket near the ends of the surfaces 47. As the links of the silent chain 36 wrap around the sprocket 46, the back-side link geometry 38 of adjacent links 36 comes into driving contact with a sprocket protrusion 48 at the surfaces 47. The chain 37 engages larger sprocket protrusions 48 than those in the embodiment of FIGS. 5 and 6, thereby holding the chain on the sprocket 46 more securely.

The relatively flat back-side link geometry 38 again results in improved sliding contact between the link backside 38 and a tensioner shoe, as compared with the intermittent contact of conventional toothed designs. The frontside 44 of the link 36 is again a conventional silent chain tooth design wherein each link 36 quietly meshes with a front-side sprocket to contact three teeth of the sprocket.

In all embodiments, the back-sides of the adjacent links along the chain direction form a generally continuous smooth back surface of a silent chain. The back-side of the chain links either overlie a single low profile protrusion, or extend over a surface that forms adjacent surfaces of adjacent sprocket protrusions. This is in contrast to the conventional teeth on the front-side of the link which are formed to engage three teeth of a conventional sprocket. Because the back-side of the link engages fewer surfaces along the periphery of a sprocket compared to the conventional teeth of the front-side, the surface of the back-side of the link extends a greater distance along the chain direction of the link than do the flanks of the teeth on the front-side of the link that engage conventional sprocket teeth.

While the invention has been described with reference to several preferred embodiments, those skilled in the art will understand that various changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A silent chain and sprocket assembly comprising:
    a sprocket having a plurality of low profile protrusions extending outwardly from said sprocket at locations spaced along an outer periphery of the sprocket;
    a silent chain having a series of inner link rows lying along a chain direction and a series of outer link rows, an outer link row between adjacent inner link rows and interleaved at opposite ends of the outer link row along the chain direction with the adjacent inner link rows;
    adjacent inner and outer link rows are joined to each other by members extending through interleaved portions of adjacent inner and outer link rows to form a rotatable joint between the adjacent inner and outer link rows;
    the links of said inner and outer link rows form a surface that extends along the chain direction of the links a distance that approximates the distance from a center of a member joining the link to one adjacent row of links to a center of a member joining the link to another adjacent row of links, overlies the sprocket protrusions and contacts said low profile protrusions along at least the majority of the length of the surface for driving contact with the low profile protrusions; and
    the link surface extending along the chain direction a distance substantially the length of the link along the chain direction.

2. The silent chain and sprocket assembly of claim 1 wherein the surface of the links that is sized to overlie the low profile protrusions of the sprocket is at a back-side of the chain.

3. The silent chain and sprocket assembly of claim 2 wherein the links have a surface that defines two teeth extending from the link at a front-side of the chain.

4. The silent chain and sprocket assembly of claim 1 wherein the surface that overlies the sprocket protrusions extends along the chain direction of the links a distance that approximates the distance from a center of a member joining the link to one adjacent row of links to a center of a member joining the link to another adjacent row of links.

* * * * *